(12) United States Patent
Enoch

(10) Patent No.: US 11,249,374 B2
(45) Date of Patent: Feb. 15, 2022

(54) MOBILE DEVICE CAMERA FILTER

(71) Applicant: Duard Enoch, Santa Barbara, CA (US)

(72) Inventor: Duard Enoch, Santa Barbara, CA (US)

(*) Notice: Subject to any disclaimer, the term of this patent is extended or adjusted under 35 U.S.C. 154(b) by 0 days.

(21) Appl. No.: 17/134,839

(22) Filed: Dec. 28, 2020

(65) Prior Publication Data

US 2021/0200069 A1    Jul. 1, 2021

Related U.S. Application Data

(60) Provisional application No. 62/954,537, filed on Dec. 29, 2019.

(51) Int. Cl.
| | | |
|---|---|---|
| *G03B 17/56* | (2021.01) | |
| *H04M 1/21* | (2006.01) | |
| *G03B 11/00* | (2021.01) | |
| *G02B 7/00* | (2021.01) | |

(52) U.S. Cl.
CPC ........... *G03B 17/565* (2013.01); *G02B 7/006* (2013.01); *G03B 11/00* (2013.01); *G03B 17/566* (2013.01); *H04M 1/21* (2013.01)

(58) Field of Classification Search
None
See application file for complete search history.

(56) References Cited

U.S. PATENT DOCUMENTS

| | | | | |
|---|---|---|---|---|
| 9,176,365 | B2* | 11/2015 | Kurashige | G02B 27/48 |
| 9,661,200 | B2* | 5/2017 | O'Neill | G03B 17/566 |
| 9,823,434 | B2* | 11/2017 | Ranetkins | G02B 23/22 |
| 10,750,067 | B2* | 8/2020 | Kraemer | H04N 5/2254 |
| 2020/0133104 | A1* | 4/2020 | Madonia | G03B 17/566 |

OTHER PUBLICATIONS

Backscatter Flip 5 Guide, "http://www.backscatter.com/reviews/post/Best-GoPro-Underwater-Filter-Macro-Lens-Filter-Solutions-GoPro-Hero-3-4-5", selected portions of Archive.org copy dated Oct. 2, 2017 (Year: 2017).*

* cited by examiner

*Primary Examiner* — Clayton E. LaBalle
*Assistant Examiner* — Leon W Rhodes, Jr.
(74) *Attorney, Agent, or Firm* — Felix L. Fischer

(57) ABSTRACT

A mobile device camera filter assembly having a holder and a mounting plate adapted to be adhesively attached to a surface of a mobile phone case with holder adapted to be received on the mounting plate. A filter frame is rotatably mounted to the holder with a hinge and a light filter is received in the filter frame.

6 Claims, 10 Drawing Sheets

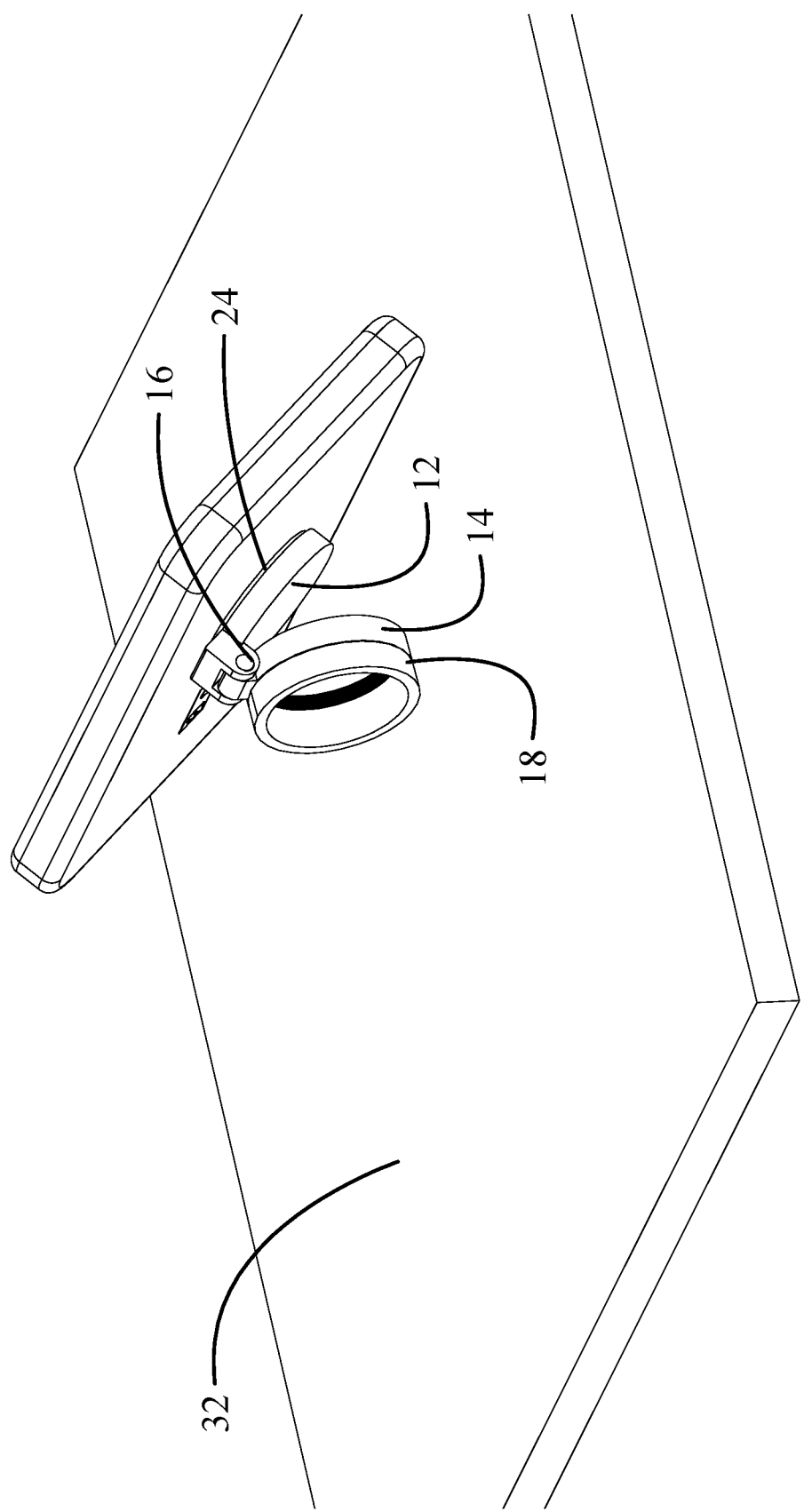

MOBILE DEVICE CAMERA FILTER

REFERENCE TO RELATED APPLICATIONS

This application claims priority to U.S. provisional application Ser. No. 62/954,537 filed on Dec. 29, 2019 entitled MOBILE DEVICE CAMERA FILTER, the disclosure of which is incorporated herein by reference.

BACKGROUND INFORMATION

Field

Implementations of the disclosure relate generally cameras for mobile devices and, more particularly, a holder and light filter frame rotatable from the holder to cover the camera lens with one or more mounted filters.

Background

Most photographers have filters for reflex cameras and other fine photography equipment. However, most amateur photographers currently use mobile devices such as mobile phones, pads and tablets for most photographs. As one example, aquarium owners and rare fish enthusiasts often take photographs of aquarium scenes. The water, transparent walls and other optical considerations for such photographs make use of a color filter desirable to obtain a quality image. A simple optical color filter system for use with mobile devices is therefore desirable.

SUMMARY

Implementations disclosed herein provide mobile device camera filter assembly having a holder and a mounting plate adapted to be adhesively attached to a surface of a device case, such as a mobile phone case, with a holder adapted to be received on the mounting plate. A filter frame is rotatably mounted to the holder with a hinge and a light filter is received in the filter frame.

BRIEF DESCRIPTION OF THE DRAWINGS

The features, functions, and advantages of the anti-personnel autonomous vehicle can be achieved independently in various implementations of the present disclosure or may be combined in yet other implementations further details of which can be seen with reference to the following description and drawings.

DETAILED DESCRIPTION

Figure 1:
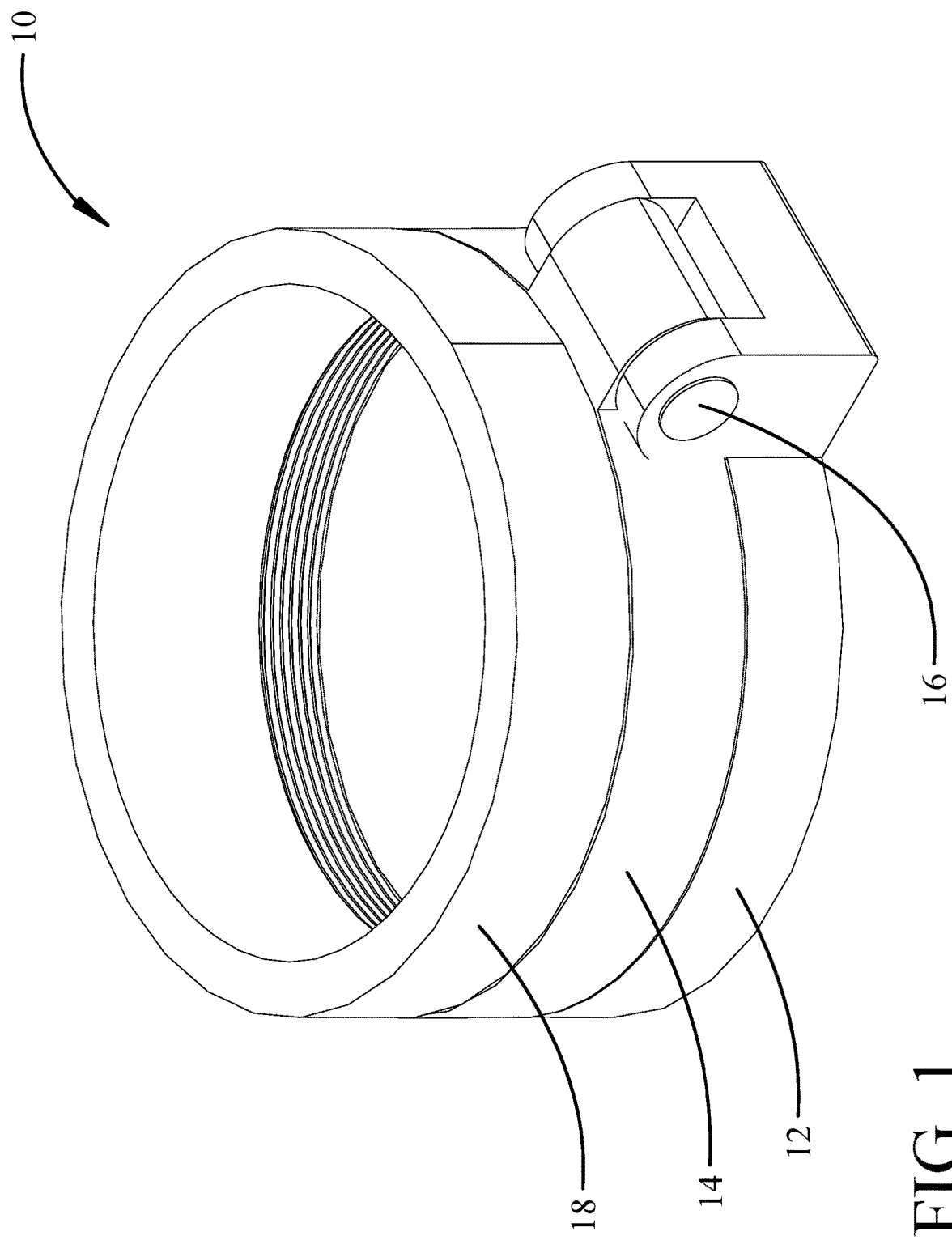
FIG. 1 is a pictorial representation of an implementation of the present disclosure.
Figure 2:
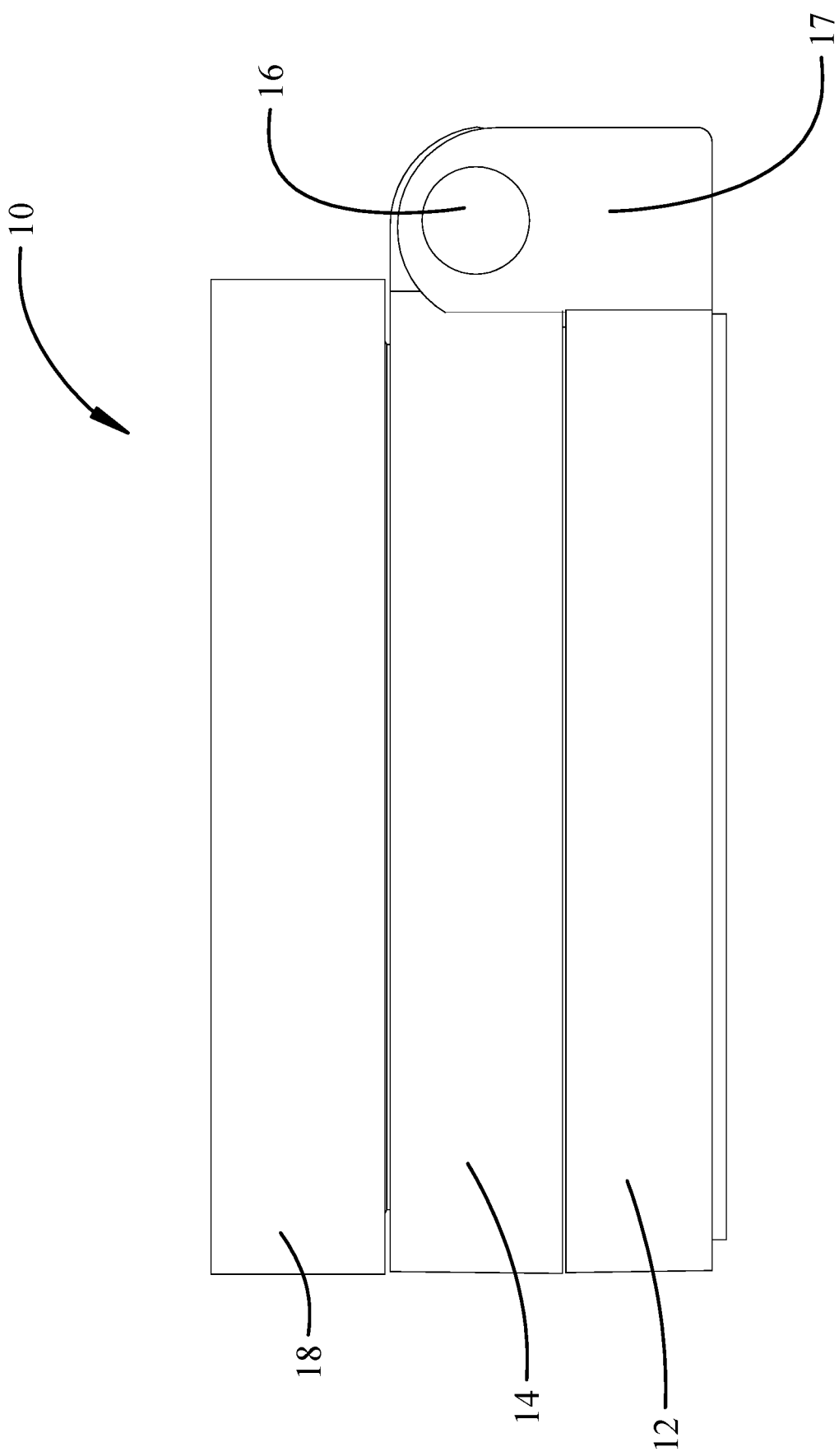
FIG. 2 is a side view of the implementation as shown in FIG. 1.
Figure 3:
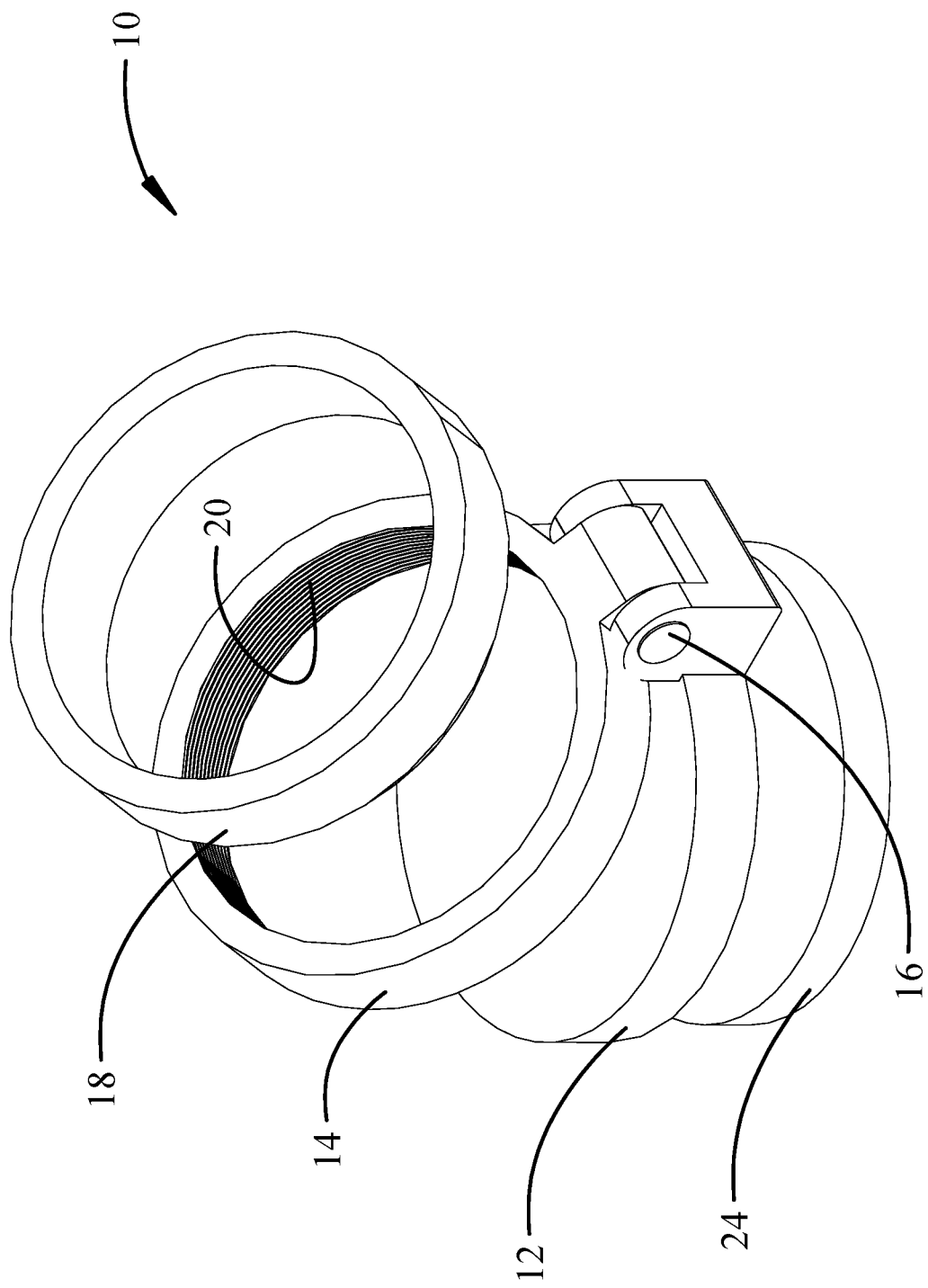
FIG. 3 is an upper pictorial open exploded view of the implementation.
Figure 4:
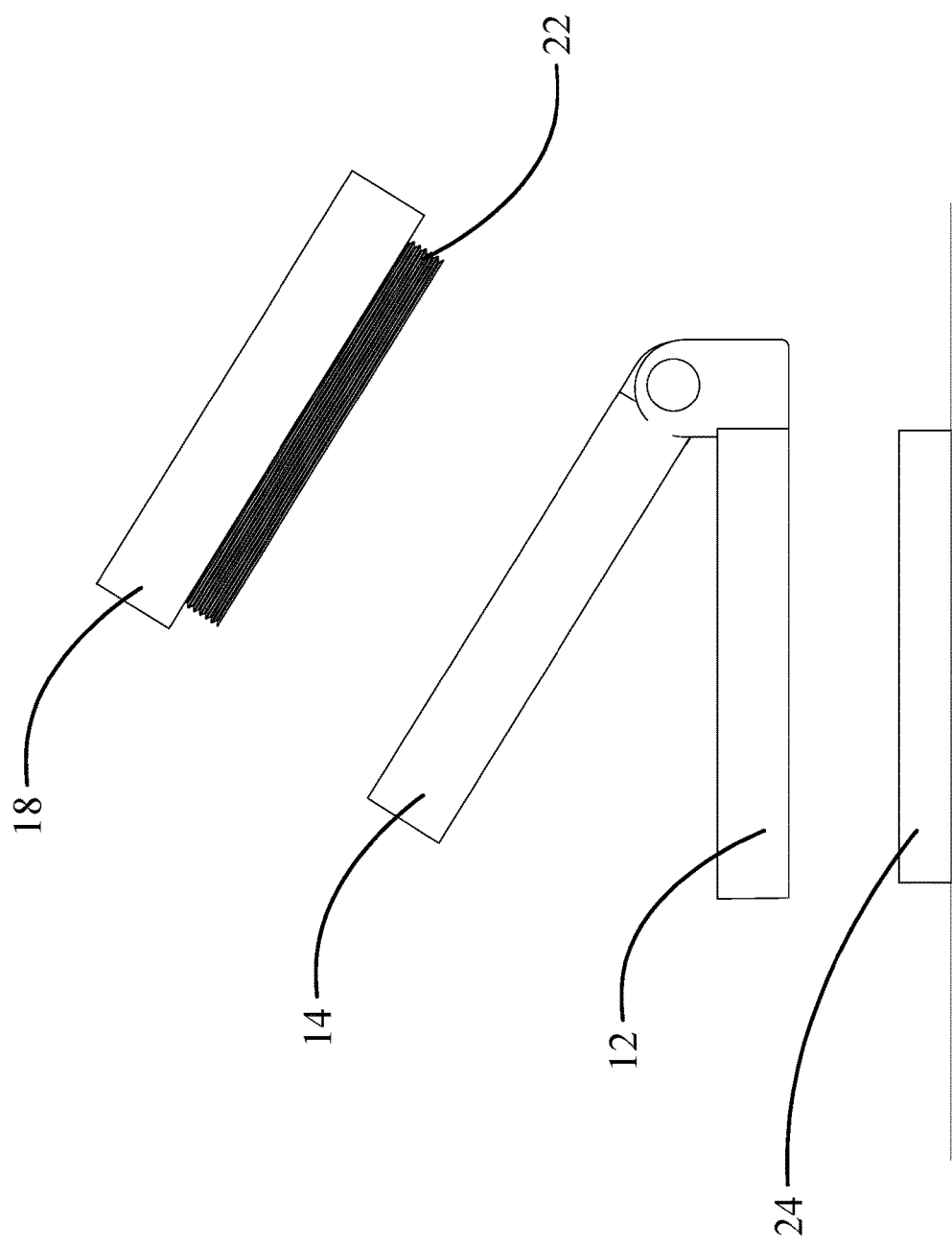
FIG. 4 is side view of the open exploded view of the implementation.
Figure 5:
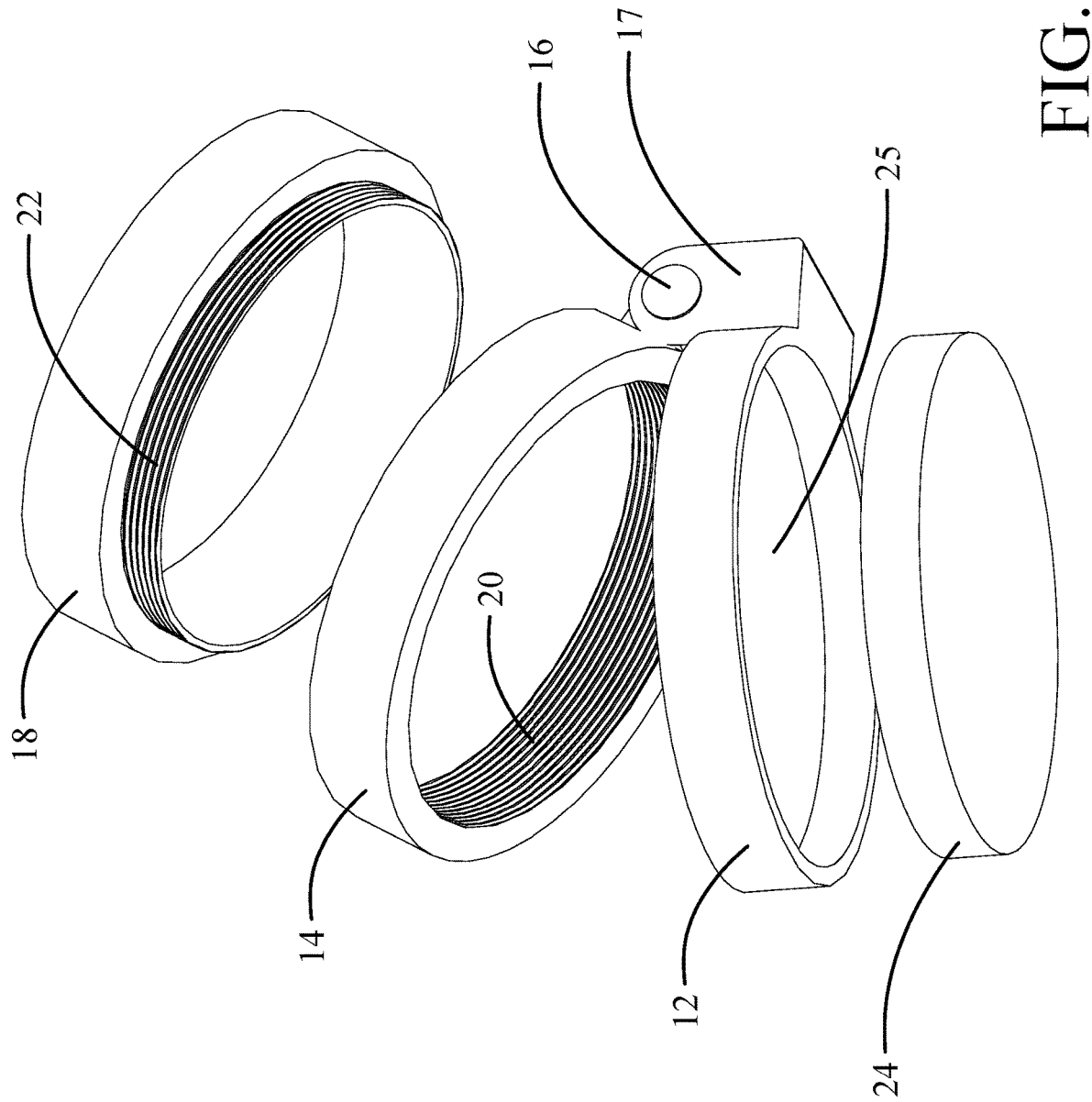
FIG. 5 is a lower pictorial open exploded view of the implementation.

Implementations disclosed herein provide a camera filter assembly for mobile phones, pads, tablets or other mobile devices. The camera filter assembly has a holder and light filter frame rotatable from the holder to cover the camera lens with one or more mounted light filters. While described herein with respect to light filters, lenses such as fisheye lenses, magnifying lenses or other optical elements may be employed. Referring to the drawings, FIGS. 1-5 show an exemplary implementation of a mobile device camera filter assembly 10 having a holder 12 with a filter frame 14 rotatably mounted with a hinge 16. A light filter 18 is received in the filter frame 14. For the example implementation, the filter frame 14 has a threaded inner bore 20 with receives an outer threaded circumference 22 on the light filter 18. In alternative implementations a snap fit or friction fit between concentric peripheries of the filter frame and light filter or similar mounting systems may be employed. A mounting plate 24 (best seen in FIGS. 3-5), of steel or other magnetic material, is adapted to be adhesively attached to a surface 26 of a mobile phone case. As seen in FIG. 5 for the implementation shown, the holder 12 has a recess 13 adapted to concentrically receive the mounting plate 24. The holder 12 includes a magnet 25 to removably and rotatably engage the holder to the mounting plate 24. While shown as cylindrical elements for the exemplary implementation, square or other polyhedral geometrical planforms are employed for the holder and mounting plate.

Figure 6:
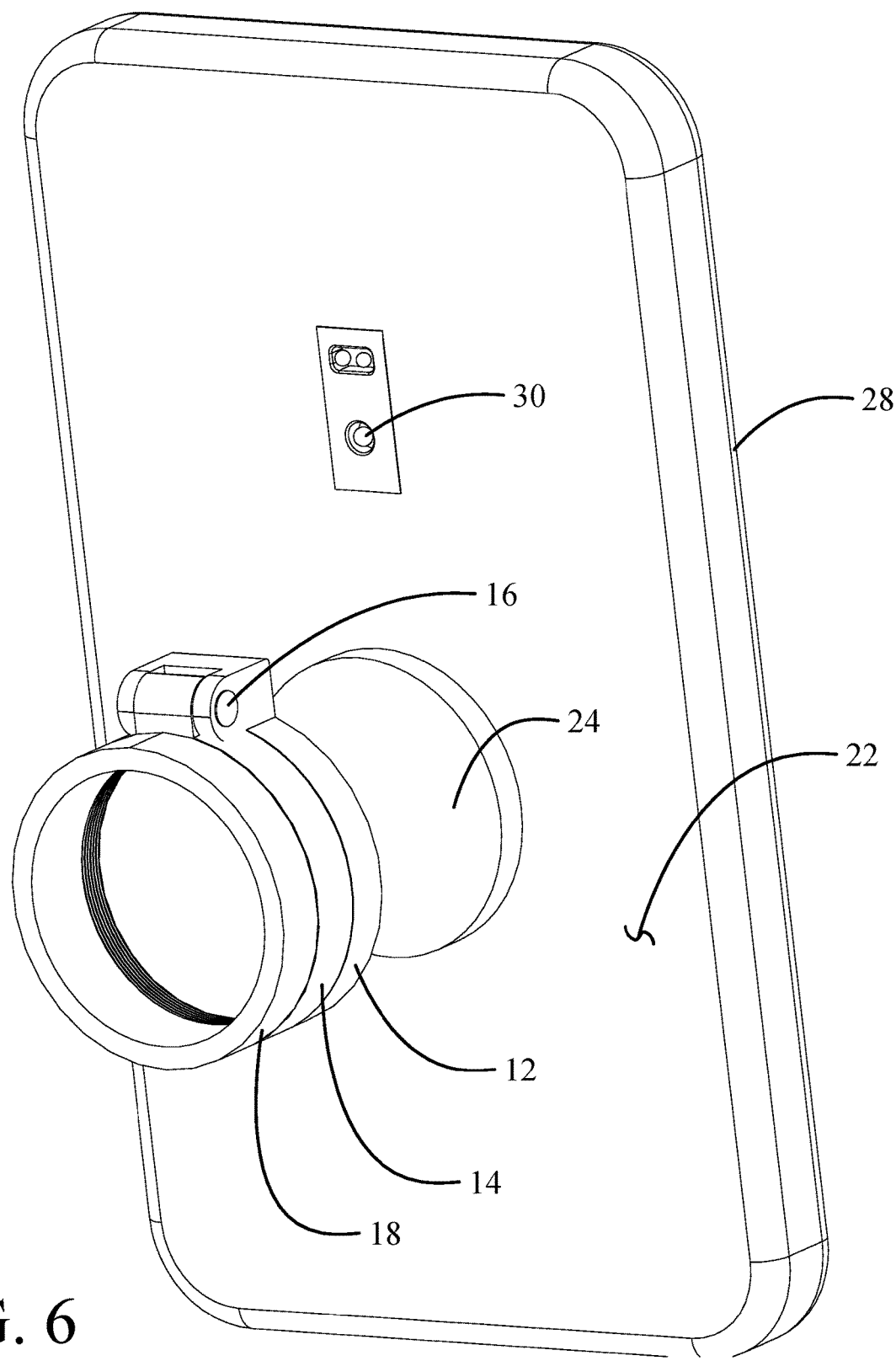
FIG. 6 is a pictorial view of a mobile phone with the mounting plate adhered to the phone and the holder, frame and light filter positioned for mounting.
Figure 7:
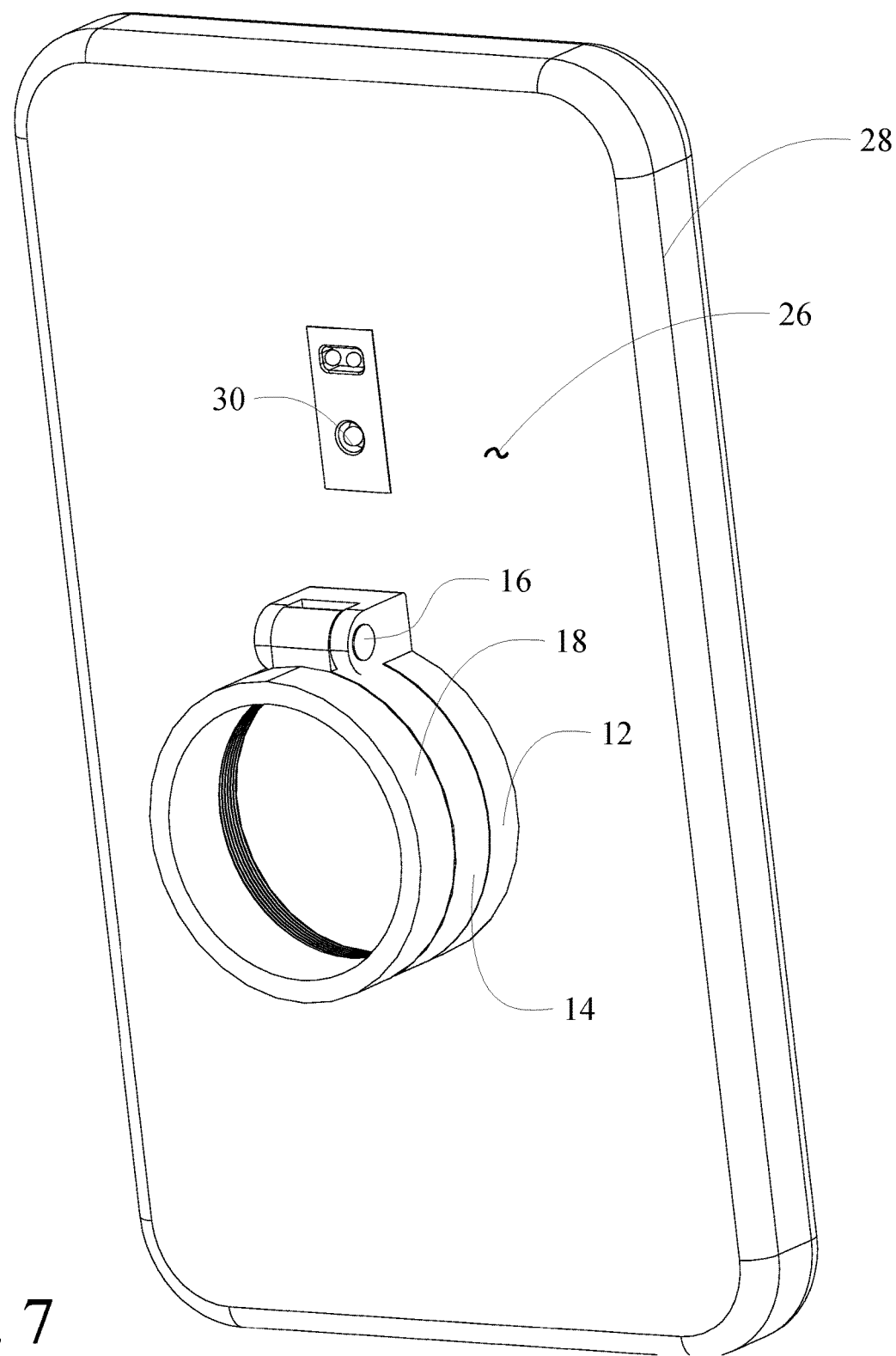
FIG. 7 is a pictorial view of the mobile phone with the mount assembly and light filter mounted in the unopened position.

As seen in FIG. 6, for an example implementation on a mobile phone, the mounting plate 24 is adhesively attached to the surface 26 of the mobile phone case 28 proximate a mobile phone camera lens 30. The holder 12 is then received on the mounting plate 24 as seen in FIG. 7. The mounting plate 24 is positioned on the mobile phone case 28 to position the rotated holder 12 with the light filter centered over the camera lens 30. This may be easily accomplished by opening (rotating the filter frame 14 from the holder 12) and positioning the filter frame on the camera lens and then rotating the holder and mounting plate 24 (with adhesive backing exposed) onto the surface 26 of the mobile phone case 28. Note that the mounting plate may be placed at any desired angle with respect to a centerline 32 of the mobile phone case 30 as long as the filter frame is centered on the camera lens 30. This allows use of the camera filter assembly on devices with centered or offset camera lenses and for any size device such as smaller mobile phones and larger pads/tablets.

Figure 8:
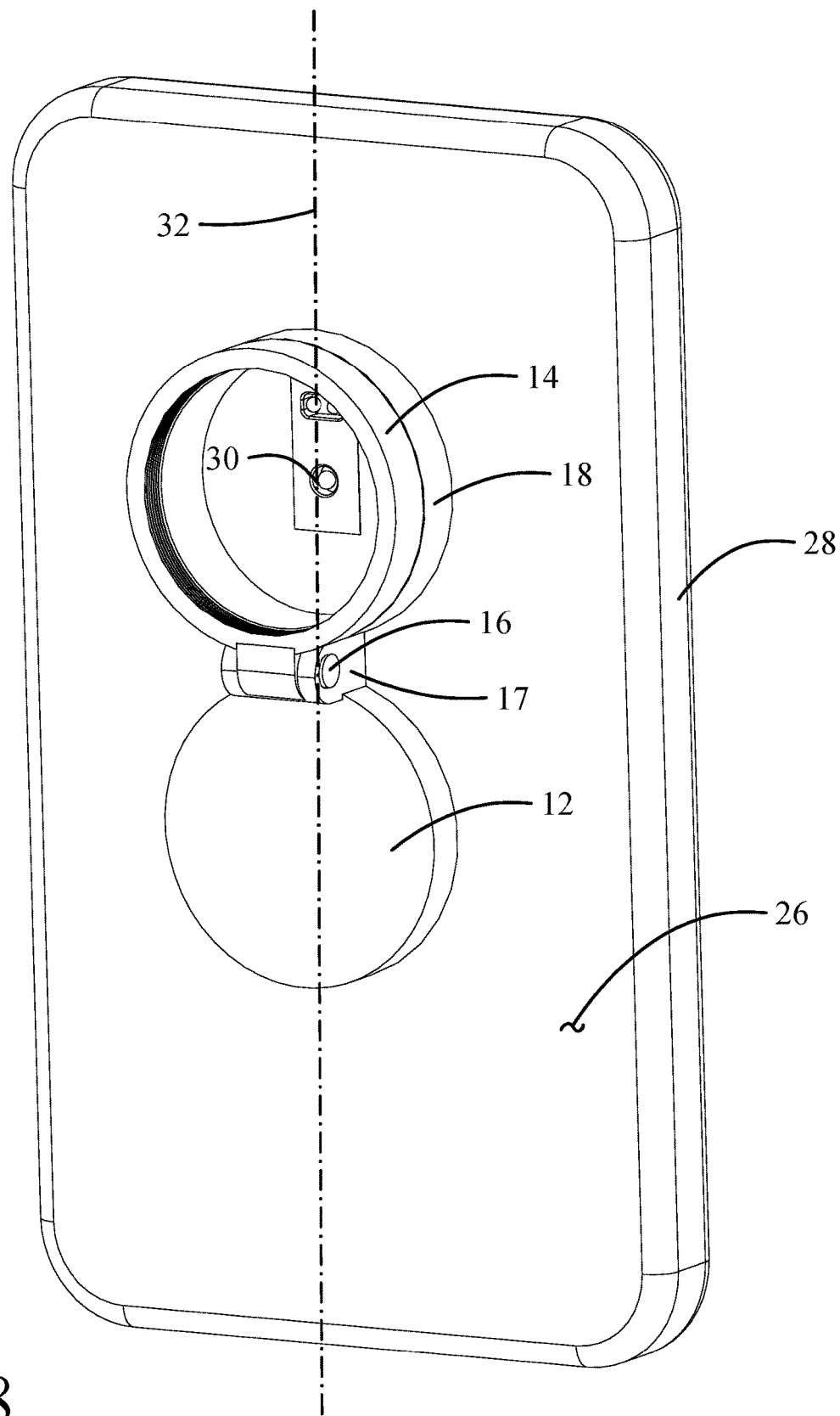
FIG. 8 is a pictorial view of the mobile phone with the frame and light filter rotated to the operational position over the mobile phone camera lens.

With the light filter 18 installed in the filter frame 14 and the filter frame rotated about the hinge 18 as seen in FIG. 8, the light filter rests on the mobile phone case and covers the camera lens 30. For the example implementation, hinge 16 is supported on a boss 17 whereby the filter frame 14 and light filter 18, when rotated from the holder 12 are parallel to the surface 24 of the cell phoned case 28.

Figure 9:
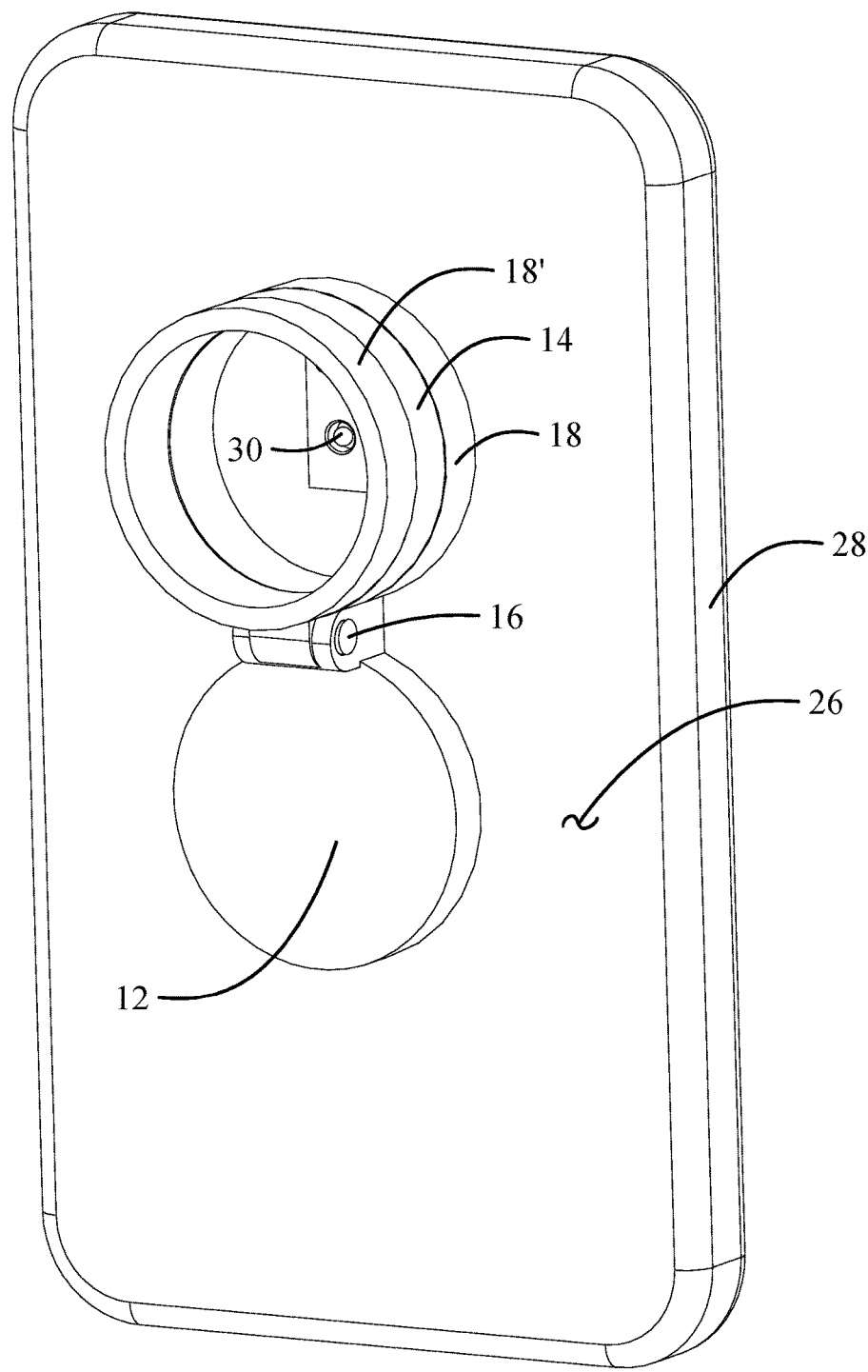
FIG. 9 is a pictorial view with a second light filter inserted into the frame opposite the first light filter for sequential additive filtering; and, FIG. 10 is a pictorial view of the mobile phone with the mount assembly rotated 90 degrees on the mounting plate and the frame rotated to a support angle for viewing support of the phone.

By threading the full depth of the inner bore 20 of the holder 12, a first light filter 18 may be installed on the top of the filter frame 14 when it is folded in non-use position, but when rotated onto the surface of the phone case to engage the surface of the case and surround the camera lens, a second filter or lens 18' can be threaded onto the back side of the filter frame to allow stacking lenses as seen in FIG. 9.

Additionally, hinge 16 is replicable with a ball hinge in alternative implementations to not only flip but rotate allowing the light filters or lenses to be always facing away from the camera lens and multiple lenses/filters could then be stacked sequentially one on top of the other on the outer lens/filter.

The holder 12 is rotatably receivable on the mounting plate 24. When not in use as for placement of a filter over the camera lens, the filter frame 14 (with or without filter 18 attached) is rotatable through a range of angles allowing combined rotation of the mounting plate and filter frame to provide a support to position the mobile phone on a surface 32 such as a table for viewing of the screen of the phone as seen in FIG. 10.

Having now described various implementations of the disclosure in detail as required by the patent statutes, those skilled in the art will recognize modifications and substitutions to the specific implementations disclosed herein. Such modifications are within the scope and intent of the present disclosure as defined in the following claims.

What is claimed is:

1. A mobile device camera filter assembly comprising:
   a holder;
   a mounting plate adapted to be adhesively attached to a surface of a mobile device, said holder adapted to be received on the mounting plate;
   a filter frame rotatably mounted to the holder with a hinge; and
   a light filter received in the filter frame;
   wherein when the filter frame is rotated about the hinge the light filter rests on the surface of the mobile device.

2. The mobile device camera filter assembly of claim 1 wherein the filter frame has a threaded inner bore with receives an outer threaded circumference on the light filter.

3. The mobile device camera filter assembly of claim 1 wherein the mounting plate is steel or other magnetic material and is adapted to be adhesively attached to the surface of the mobile device.

4. The mobile device camera filter assembly of claim 2 wherein the holder has a recess adapted to concentrically receive the mounting plate.

5. The mobile device camera filter assembly of claim 3 wherein the holder includes a magnet to removably and rotatably engage the holder to the mounting plate.

6. The mobile device camera filter assembly of claim 1 wherein the holder is rotatably receivable on the mounting plate and the filter frame is rotatable through a range of angles allowing combined rotation of the mounting plate and filter frame to provide a support to position the mobile phone on a surface for viewing of the screen of the phone.

* * * * *